United States Patent
Mathys et al.

(10) Patent No.: US 8,271,742 B2
(45) Date of Patent: Sep. 18, 2012

(54) DEVICE AND METHOD TO PROCESS OFDM-BASED SYMBOLS IN WIRELESS NETWORK

(75) Inventors: Yves Mathys, Bernex (CH); Alain Duret, Saint Julien-en-Genevois (FR)

(73) Assignee: Abilis Systems SARL, Plan-les-Ouates (CH)

( * ) Notice: Subject to any disclaimer, the term of this patent is extended or adjusted under 35 U.S.C. 154(b) by 346 days.

(21) Appl. No.: 12/607,435

(22) Filed: Oct. 28, 2009

(65) Prior Publication Data

US 2010/0049923 A1     Feb. 25, 2010

Related U.S. Application Data

(63) Continuation of application No. PCT/EP2007/055370, filed on May 31, 2007.

(51) Int. Cl.
    *G06F 12/00*     (2006.01)
(52) U.S. Cl. ........................................ 711/151
(58) Field of Classification Search ............... None
See application file for complete search history.

(56) References Cited

U.S. PATENT DOCUMENTS

| | | | |
|---|---|---|---|
| 4,928,234 A | 5/1990 | Kitamura et al. | |
| 2002/0024993 A1 | 2/2002 | Subramanian et al. | |
| 2007/0189406 A1* | 8/2007 | Kim et al. | 375/260 |

OTHER PUBLICATIONS

International Search Report dated Apr. 4, 2008.
Written Opinion dated Apr. 4, 2008.

* cited by examiner

*Primary Examiner* — Hiep Nguyen
(74) *Attorney, Agent, or Firm* — Pearne & Gordon LLP

(57) ABSTRACT

A device and a method to efficiently process the symbols coded in OFDM according to the various protocols available. This is achieved through a device to process OFDM-based symbols comprising a base band input data and a base band output data, and comprising at least two programmable execution units connected to at least one working memory, this device being characterized in that, the programmable execution units (EU) are connected to the memory (M-1, M-2, M3, . . . M-N) through a memory management unit (PL_MMU), said programmable execution units (EU) having an input memory range and an output memory range, the device further comprising a state scheduler (SCH) connected to the execution units (EU) and to the memory management unit (PL_MMU), said scheduler (SCH) having means to:
load the related program into the execution units (EU) thus defining the function and the input and output memory ranges of said programmable execution units (EU),
assign the input and output memory range of said working memory relative to the programmable execution unit (EU) with the programmable execution unit (EU) input and output memory ranges through the memory management unit (PL_MMU) at each pipeline period,
define the processing data flow of the symbols by defining the number of programmable execution units (EU) and the order in which the programmable execution units (EU) are involved.

20 Claims, 2 Drawing Sheets

| SY | EA | DP | | |
|----|----|----|----|----|
|    |    | MD1 | MD2 | MD3 |
|    |    |     |     |     |

DEVICE AND METHOD TO PROCESS OFDM-BASED SYMBOLS IN WIRELESS NETWORK

INTRODUCTION

This invention concerns the field of mobile communication device and in particular, to wireless mobile communication device able to communicate through one or more communication protocols such as DAB, DVB, WLAN or WiMAX.

PRIOR ART

Most broadband communication protocols are based on OFDM modulation, such as DAB, DVB, DVB-T, DVB-H, T-DMB, WLAN, WiMAX. Although these standards are based on the same modulation, they differ in many ways and use a variety of modulation parameters and operating modes.

The invention concerns a mobile device having a programmable processing architecture allowing demodulation and modulation of OFDM symbols supporting multiple OFDM standards such as DAB, DVB, WLAN or WiMAX.

Systems today are based on specific protocols, dedicated hardware blocks for OFDM processing. In order to support additional OFDM protocols, the entire system must be re-developed. In the final product, the processing elements are duplicated resulting in large area and duplication of similar functional blocks.

Orthogonal frequency-division multiplexing (OFDM), also sometimes called discrete multitone modulation (DMT), is a complex modulation technique for transmission based upon the idea of frequency-division multiplexing (FDM) where each frequency channel is modulated with a simpler modulation. In OFDM the frequencies and modulation of FDM are arranged to be orthogonal with each other which almost eliminates the interference between channels. Although the principles and some of the benefits have been known for 40 years, it is made popular today by the lower cost and availability of digital signal processing components.

A number of extra useful benefits, particularly multipath resistance, arise when the data is coded with some Forward Error Correction (FEC) scheme prior to modulation called channel coding. This is called Coded OFDM abbreviated to COFDM.

COFDM is also now widely used in Europe and elsewhere for terrestrial digital TV using the DVB-T standard. One of the major benefits provided by COFDM is that it renders radio broadcasts relatively immune to multipath distortion, and signal fading due to atmospheric conditions, or passing aircraft.

BRIEF DESCRIPTION OF THE INVENTION

Embodiments of this invention relate to a device and a method to efficiently process the symbols coded in OFDM according to the various protocols available.

In particular, the present invention can comprise a device to process OFDM-based symbols comprising a base band input data and a base band output data, and comprising at least two programmable execution units connected to at least one working memory, this device being characterized in that, the programmable execution units (EU) are connected to the memory through a memory management unit, said programmable execution units having an input memory range and an output memory range, the device further comprising a state scheduler connected to the execution units and to the memory management unit, said scheduler having means to:
- load the related program into the execution units thus defining the function and the input and output memory ranges of said programmable execution units,
- assign the input and output memory range of said working memory relative to the programmable execution unit with the programmable execution unit input and output memory ranges through the memory management unit at each pipeline period,
- define the processing data flow of the symbols by defining the number of programmable execution units and the order in which the programmable execution units are involved.

The OFDM symbol is processed through multiple pipeline stages, similar to a pipeline processing unit found in typical MCU execution unit, however, in the present invention, the pipeline execution unit is fully re-configurable, i.e.
- the number of stages
- the memory resource allocation per execution unit
- the sequence of the pipeline
- the data flow This allows adapting to any OFDM symbol processing requirements defined in the broadband standards with their mode of operations such as synchronization, sniffing, receiving, transmitting, etc.

The system is based on a priority based memory map unit which eliminates data movement in the pipeline, thus, saving processing and power.

The programmable execution units are preferably Digital Signal Processor (DSP).

BRIEF DESCRIPTION OF THE FIGURES

The invention will be better understood thanks to the attached figures in which:
- the FIG. 1 illustrates an OFDM pipeline processing architecture
- the FIG. 2 illustrates a three stages pipeline processing
- the FIG. 3 illustrates a four stages pipeline processing with 2 concurrent stages
- the FIG. 4 illustrates the set of parameters defining the behaviour of the pipeline processing device.

DETAILED DESCRIPTION

At the receiver, the antenna signal is sent to an A/D conversion unit. This unit generates a stream of digital complex values, typically with a resolution of 6-12 bits. Since the receiver has to detect the beginning of the sequence of OFDM symbols, a special coding (referred to as frame header) is used. The structure of such a frame depends on the specific wireless standard used. A part of a header according to the Hiperlan 2 standard is shown in the figure below.

| A | ---A | A | ---A | B | ooo | B | B | --B | P0 | P1 | ... | ... | ... | ... | Pn |
|---|------|---|------|---|-----|---|---|-----|----|----|-----|-----|-----|-----|----|

The signals A and B are predefined values. The first task of an OFDM decoder is to find the sequence of A's and B's. If this header was detected, the information bits have to be demodulated by using a Fourier transform. This implementation analysis is based on the detection of the B; B; −B sequence.

Since the incoming signal is oversampled, the introduction of a down sampling stage is necessary at the input. A second step is the removal of the header. A third step is concerned with removing the interference protection copy to get the 64 symbols for the FFT. This sequence of 64 complex values is sent to a FFT 64 stage to compute the original 64 information bits. The next step is the selection of the 48 information bits, out of the QPSK coded 64 values. Since a FFT like structure is used in a decoder application the output sequence generated by the FFT has to be sorted again. This is done in combination with the selection of the 48 information bits.

To improve bandwidth interference (introduced by channel noise and reflections), a copy of the last bits is added to the beginning of the time domain signal. The resulting stream of packets is called an OFDM symbol. A sequence of OFDM symbols including a specific header is transmitted. The header is used to detect the beginning of a sequence of OFDM symbols and may contain additional information like the type of transmission.

According another way of broadcast using OFDM protocol such as on Mobile TV, no preamble (A,B sequence) is used but pilots are scattered in the data and up to 8000 carriers.

Figure 1:
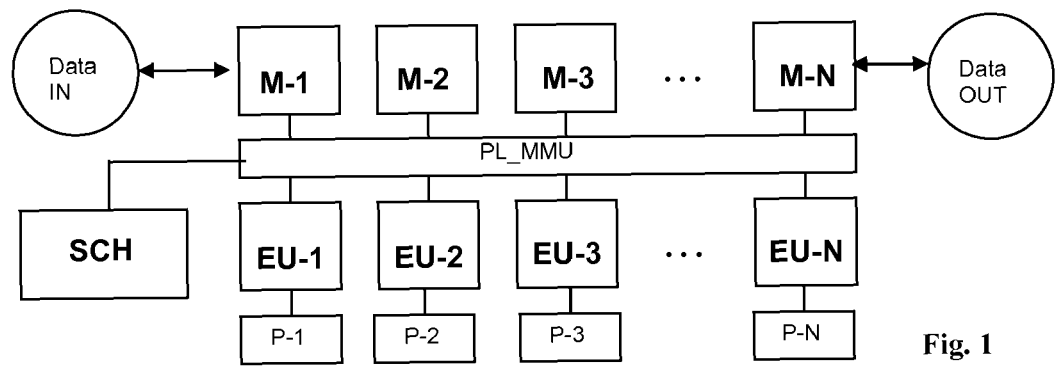

Various processing are executed by the receiver which are OFDM standards dependent, i.e.:
  synchronization (special frame as for Hyperlan or pilots)
  frequency correction and FFT
  channel estimation and correction
  gain control over the reception chain In order to process the stream of symbols, appropriate device architecture is necessary. The architecture, as illustrated in the FIG. 1 is made of 1 to N execution units (EU-1, . . . EU-N). Each unit is programmable and a set of programs are stored into a dedicated program memory (P1, . . . PN). The data memory blocks set, M1 . . . M-N, are physical memory blocks connected to a common bus interface. The memory blocks are mapped into a virtual memory map shared by the execution units.

The PL_MMU unit is a configurable memory management unit, this unit maps the virtual addresses to the physical addresses. This unit allows concurrent data access allowing parallel processing with dedicated memory resources allocated to the execution unit EU. The access to the physical blocks is priority based, the priority depends on the pipeline stage and it sets by the pipeline scheduler (SCH).

The scheduler SCH, is a state-machine unit which dynamically configures the pipeline mechanism for a given operating mode. This unit configures the memory management unit PL_MMU defining the number of stages in the pipeline, setting the pipeline flow of execution, allocating memory resources to the execution unit EU and setting the pipeline time period.

Once the pipeline time period expired, the scheduler SCH reconfigures the memory management unit PL_MMU memory mapping and priority avoiding data copy between the pipeline stages, thus saving power and processing.

The OFDM symbol, Data In, is a stream of I/Q sampled data by an ADC data converter. The Data out is a demodulated data bit stream feeding the error correction unit. In the modulation operating mode, the Data Out is the incoming bit stream and the output, Data-In then, is the modulated data steam.

Figure 2:
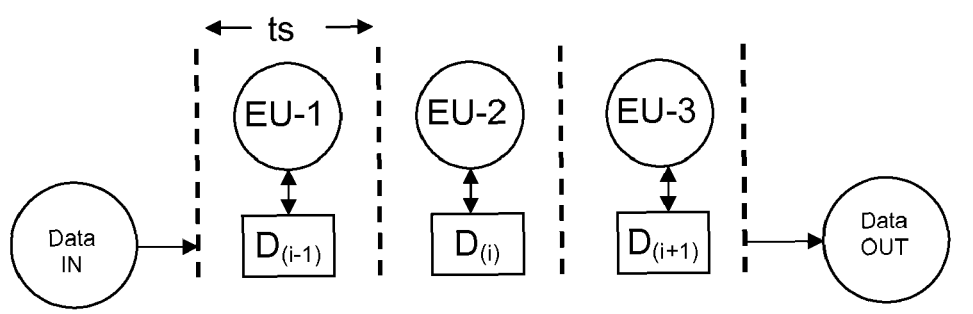

For a 3 stages pipeline, the mode operation is depicted in the FIG. 2. The EU unit runs for one pipeline period, ts, which is programmed in the memory management unit PL_MMU. After this time period, the PL_MMU remaps the memory allocation so the data processed by EU-1 is then allocated to the working address of the EU-2 unit.

Figures 3, 4:
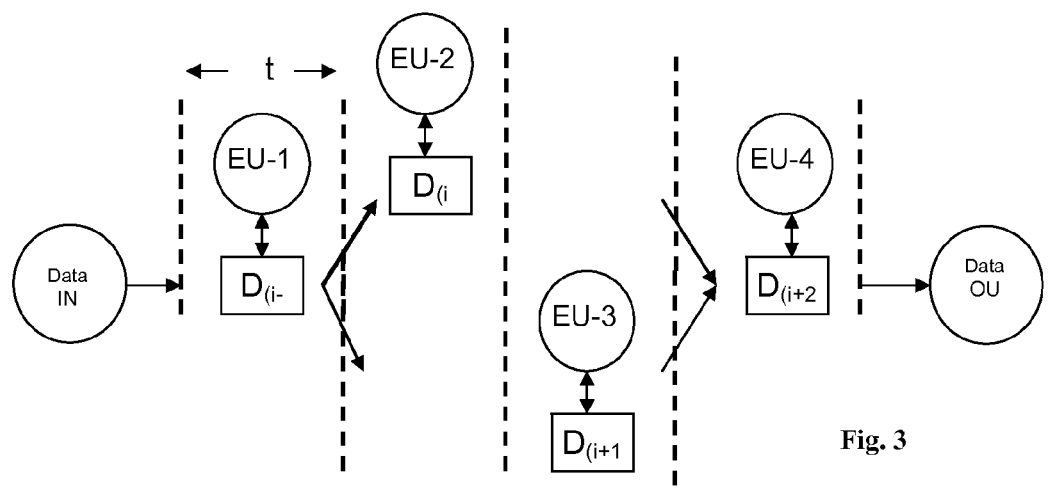

The number of stages in the execution pipeline and the data flow is fully reconfigurable. While the pipeline period is fixed for a given operating mode, the system is capable to allocate multiple periods to a set of execution stage. For example, as seen in FIG. 3, the pipeline period for the execution unit 2 and 3 are 2×ts (pipeline period), so the data processed in the first stage is ping-pong between the working address of EU-2 and EU-3. The scheduler can define the connection between each execution unit EU according to the program currently loaded. In the example of the FIG. 3, the same program is loaded in the execution unit EU-2 and the execution unit EU-3. In order to save time since the process in these two executions unit needs two pipeline period, two execution units are dedicated to the same task, alternatively loaded with the symbol to be processed. The execution unit EU-4 receives the data alternatively from execution unit EU-2 and EU-3. The task of the scheduler SCH is to remap the input memory range of the execution unit EU-4, i.e. during a first pipeline period to the output memory range of the execution unit EU-2, and during the second pipeline period, the scheduler maps the input memory range of the execution unit EU-4 to the output memory range of the execution unit EU-3.

The number of execution units involved is scalable. Depending of the protocol currently selected or for a given pre-processing, not all execution units are necessary active. The scheduler defines the data flow and the connections of the execution units to achieve the current task. This can be done dynamically when the processing conditions (data errors, noise, multi-path detection) lead to an increase of the correction operations to extract the data.

A task for an execution unit EU last usually one pipeline period. Each pipeline period, the execution unit re-execute the same task on a different set of data. In some cases, a task can last more than one pipeline period and the scheduler tend to optimize the various tasks so that another execution has no to wait until the former execution unit ends. This is illustrated at the FIG. 2 already described.

When an execution unit is not necessary for a given process, e.g. the synchronization stage when less processing power is necessary, the scheduler SCH can deactivate the idled execution unit. This can be achieved by freezing the clock applied to said execution unit or switching off the power supply. The scheduler can also anticipate the future need of an execution unit currently in idle mode by restating it i.e. applying the power supply or feeding the clock.

The FIG. 4 shows the set of parameters that are used by the device, in particular the scheduler SCH. The processing of a symbol in a given protocol is mainly based on three stages. The first stage is the synchronization step SY. The inputted data is processed so as to detect the markers within the signal to synchronize the data acquisition.

The second stage is the early acquisition EA of the data. During that stage, the environmental conditions are detected so as to have a better figure of the delay, echo, noise on the signal.

The third stage is the data processing DP i.e. the extraction of the symbols. In this stage, different algorithms MD1, MD2, MD3 can be used depending on the conditions previously detected.

A set of parameters comprises the program to be loaded into the execution unit EU, the execution units participating to the task, the mapping between the working memory and the input and output memory range for each execution unit relative to the pipeline period. This mapping is a dynamic process since for each pipeline period, the mapping can vary.

At the input of the device, the scheduler synchronizes the arrival of the input data into the working memory accessible by the first execution unit and trig the first execution unit to start the processing when sufficient data are in. It is not necessary to wait until the full symbol is loaded into the memory to start the processing since the execution unit can process the inputted data from part of the symbol.

The claimed pipeline processing allows:

Scalable multiprocessors architecture from 2 to N processors

Reconfigurable pipeline execution unit

Fast reconfigurable switch mode (<100 us)

Zero data move architecture saving power and performance

Facilitate software development with fixed working memory address

Common memory space to ease processors communication

The invention claimed is:

1. A device to process OFDM-based symbols comprising a base band input data and a base band output data, and comprising at least two programmable execution units connected to at least one working memory, this device being characterized in that, the programmable execution units are connected to the memory through a memory management unit, said programmable execution units having an input memory range and an output memory range, the device further comprising a state scheduler connected to the execution units and to the memory management unit, said scheduler having means to
 load a related program into the execution units thus defining the task and the input and output memory ranges of said programmable execution units,
 assign the input and output memory range of said working memory relative to the programmable execution units with the programmable execution units input and output memory ranges through the memory management unit at each pipeline period,
 define a processing data flow of the symbols by defining the number of programmable execution units and the order in which the programmable execution units are involved.

2. The device of claim 1, characterized in that, the scheduler has means to set the base band input and base band output data priority for each execution unit defining the priority to access the working memory.

3. The device of claim 1 comprising at least three execution units, characterized in that the scheduler has means to map, through the memory management unit, the input memory range of the last execution unit to the output memory range of the first execution unit during a first pipeline period and to map the input memory range of the last execution unit to the output memory range of the second execution unit during a second pipeline period.

4. The device of claim 1 comprising at least three execution units, characterized in that the scheduler has means to map, through the memory management unit, the output memory range of the first execution unit to the input memory range of the second execution unit during a first pipeline period and to map the output memory range of the first execution unit to the input memory range of the third execution unit during a second pipeline period.

5. The device of claim 1, characterized in that, the scheduler has means to deactivate the execution units not currently involved in the processing thus saving power supply.

6. The device of claim 5, characterized in that, the deactivation of an execution unit is achieved by freezing the clock supplied.

7. The device of claim 4, characterized in that, the deactivation of an execution unit is achieved by switching off the power supply.

8. The device of claim 1, characterized in that, the scheduler comprises several set of parameters, each set defining the program to be loaded in the execution units, the execution units involved to process the data flow between the base band input and the base band output data, and the mapping between the working memory and the input and output memory range for each execution unit relative to the pipeline period.

9. The device of claim 8, characterized in that, a different set of parameters is loaded according to different protocols such as DAB, DVB, WLAN or WiMAX.

10. A method of processing OFDM-based symbols in a device comprising at least two programmable execution units connected to at least one working memory through a memory management unit a scheduler allowing the execution units to be mapped to the working memory, this method comprising the steps of:
 loading a related program into the execution units thus defining an execution unit function,
 loading into the memory management unit the input and output memory ranges of said programmable execution units allowing access by the execution units to the input and output data of said execution unit,
 assigning the input and output memory range of said working memory relative to the programmable execution units with the programmable execution unit input and output memory ranges through the memory management unit at each pipeline period,
 defining a processing data flow of the symbols by defining the number of programmable execution units and the order in which the programmable execution units are involved.

11. The method of claim 10, characterized in that, it further comprises the step of setting the base band input and base band output data priority for each execution unit defining the priority to access the working memory.

12. The method of claim 10, involving at least three execution units, characterized in that it further comprises the steps of mapping, through the memory management unit, the input memory range of the last execution unit to the output memory range of the first execution unit during a first pipeline period and mapping the input memory range of the last execution unit to the output memory range of the second execution unit during a second pipeline period.

13. The method of claim 10, involving at least three execution units, characterized in that it further comprises the steps of mapping, through the memory management unit, the output memory range of the first execution unit to the input memory range of the second execution unit during a first pipeline period and mapping the output memory range of the first execution unit to the input memory range of the third execution unit during a second pipeline period.

14. The method of claim 10, characterized in that, it further comprises the step of deactivating the execution units not currently involved in the processing to save power supply.

15. The method of claim 14, characterized in that, the deactivation of an execution unit is achieved by freezing the clock supplied.

16. The method of claim 14, characterized in that, the deactivation of an execution unit is achieved by switching off the power supply.

17. The method of claim 10, characterized in that, it further comprises the step of loading one set of parameters among several set of parameters, each set defining the program to be loaded in the execution units, the execution units involved to process the data flow between the base band input and the base band output data, and the mapping between the working memory and the input and output memory range for each execution unit relative to the pipeline period.

18. The method of claim 17, characterized in that, a different set of parameters is loaded according to different protocols such as DAB, DVB, WLAN or WiMAX.

19. A device to process OFDM-based symbols comprising a base band input data and a base band output data, and comprising at least two programmable execution units connected to at least one working memory, this device being characterized in that, the programmable execution units are connected to the memory through a memory management unit, said programmable execution units having an input memory range and an output memory range, the device further comprising a state scheduler connected to the execution units and to the memory management unit, said scheduler having means to
- load a related program into the execution units thus defining the task
- load into the memory management unit the input and output memory ranges of said programmable execution units allowing access by the execution units to the baseband input and base band output data of said execution units,
- assign the input and output memory range of said working memory relative to the programmable execution units with the programmable execution units input and output memory ranges through the memory management unit at each pipeline period,
- define a processing data flow of the symbols by defining the number of programmable execution units and the order in which the programmable execution units are involved.

20. A method of processing OFDM-based symbols in a device comprising base band input data and base band output data, and comprising at least two programmable execution units connected to at least one working memory, wherein the method comprises the connection of the programmable execution units to the working memory through a memory management unit, said programmable execution units having an input memory range and an output memory range, and further comprising the connection of a state scheduler to the execution units and to the memory management unit, allowing the execution units to be mapped to the working memory, this method comprising the steps of:
- loading a related program into the execution units thus defining an execution unit function,
- loading into the memory management unit the input and output memory ranges of said programmable execution units allowing access by the execution units to the base band input and base band output data of said execution unit,
- assigning the input and output memory range of said working memory relative to the programmable execution unit with the programmable execution unit input and output memory ranges through the memory management unit at each pipeline period,
- defining a processing data flow of the symbols by defining the number of programmable execution units and the order in which the programmable execution units are involved.

* * * * *